United States Patent
Booth, Jr. et al.

(10) Patent No.: US 6,300,621 B1
(45) Date of Patent: Oct. 9, 2001

(54) COLOR CALIBRATION DEVICE AND METHOD

(75) Inventors: Lawrence A. Booth, Jr., Phoenix; Craig P. Donovan, Chandler, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/208,204

(22) Filed: Dec. 9, 1998

(51) Int. Cl.$^7$ ..................................................... G01N 21/47
(52) U.S. Cl. ........................................... 250/228; 356/236
(58) Field of Search ..................................... 250/228, 216, 250/229, 237 R, 559.16, 559.17, 559.18; 356/236, 243.5, 30

(56) References Cited

U.S. PATENT DOCUMENTS

| | | | |
|---|---|---|---|
| 4,232,971 | * 11/1980 | Suga | 250/228 |
| 5,268,749 | * 12/1993 | Weber et al. | 356/446 |
| 5,828,449 | * 10/1998 | King et al. | 356/237.1 |
| 5,914,245 | * 6/1999 | Bylina et al. | 435/19 |

FOREIGN PATENT DOCUMENTS 59-60229 * 4/1984 (JP) ..................................... 250/228

* cited by examiner

Primary Examiner—John R. Lee
Assistant Examiner—Kevin Pyo
(74) Attorney, Agent, or Firm—Seth Z. Kalson

(57) ABSTRACT

A calibration apparatus for calibrating a color imager, the calibration apparatus comprising an integrating sphere having at least one port, at least one light emitting diode, and an optical baffle so that light provided by the at least one light emitting diode is reflected upon the inner surface of the integrating sphere before exiting the at least one port.

8 Claims, 4 Drawing Sheets

COLOR CALIBRATION DEVICE AND METHOD

FIELD

Embodiments of the present invention relate to imaging, and more particularly, to a method and apparatus for color calibration of a color camera.

BACKGROUND

A colorimetric photon source is useful in calibrating the colorimetric response of a color imaging device. In addition to calibration, the response of the imaging device to a photon source of known wavelength may be measured for purposes of characterization and quality control.

It is known that reflective imaging targets may be provided for color calibration. Reflective targets for calibration generally use a reflective colorimetric substance such as paint and are illuminated with broadband (white) light sources. However, reflective targets generally have broadband reflectance, which complicates color camera calibration. Reflective targets are difficult to illuminate uniformly, as well; making the calibration more complicated. Furthermore, many pigmented paints age and consequently change their color over their lifetime, requiring frequent re-calibration of test targets.

Consequently, it is useful in the art of color imaging calibration to provide a cost effective, stable source of photons having narrow spectral power and having a uniform illumination pattern within the field of view of the imaging device to be calibrated.

DETAILED DESCRIPTION OF THE EMBODIMENTS

Figure 1:
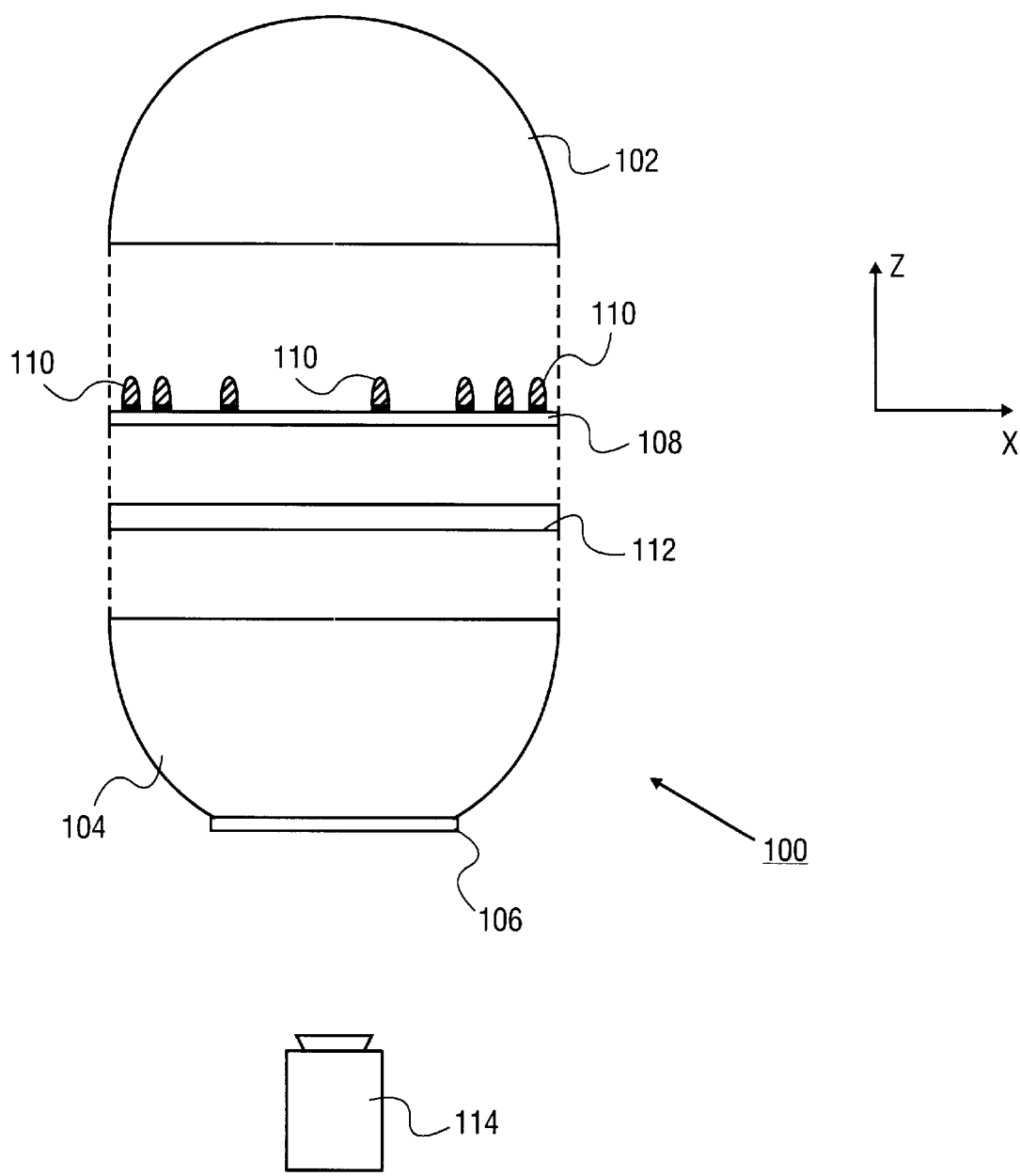
FIG. 1 is an exploded side-view of an embodiment of the present invention.

Referring to FIG. 1, calibration apparatus 100 includes a first portion 102 and a second portion 104 of an integrating sphere having single port 106. Illuminator ring 108 provides support for one or more light emitting diodes 110. Optical baffle 112 prevents direct irradiation of port 106 by light emitting diodes 110. In this way, light originating from light emitting diodes 110 and exiting port 106 has been reflected at least once upon the interior of the integrating sphere comprising portions 102 and 104. The interior surface of the integrating sphere has a reflective coating such as PTFE (poly-tetra-fluor-ethelyne). In an embodiment, optical baffle 112 and illuminator ring 108 also have reflective surfaces. As indicated in FIG. 1, imaging device 114 is responsive to radiation exiting port 106.

Figure 2:
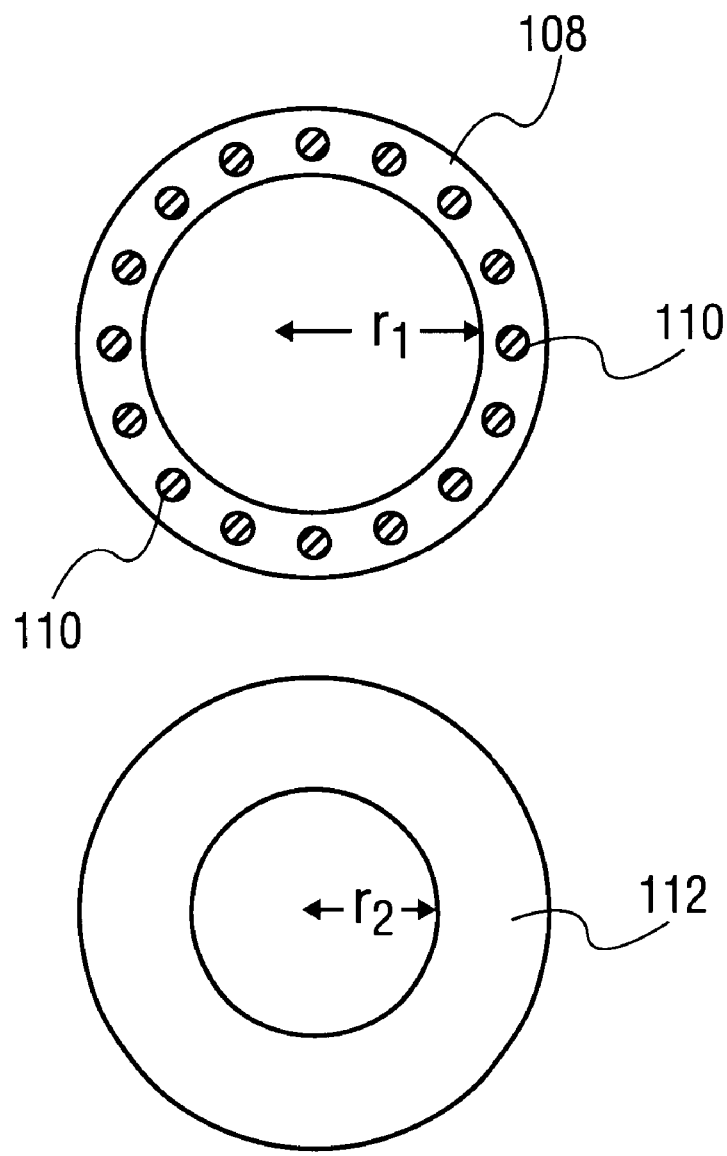
FIG. 2 is a view of an illuminator ring and an optical baffle according to an embodiment of the present invention.

FIG. 2 provides simplified views of illuminator ring 108 and optical baffle 112 in the negative z direction indicated in FIG. 1. In the embodiment provided in FIG. 2, the inner radius $r_1$ of illuminator ring 108 is greater than the inner radius $r_2$ of optical baffle 112. Light emitting diodes 110 need not necessarily be distributed uniformly along illuminator ring 108.

Figure 3:
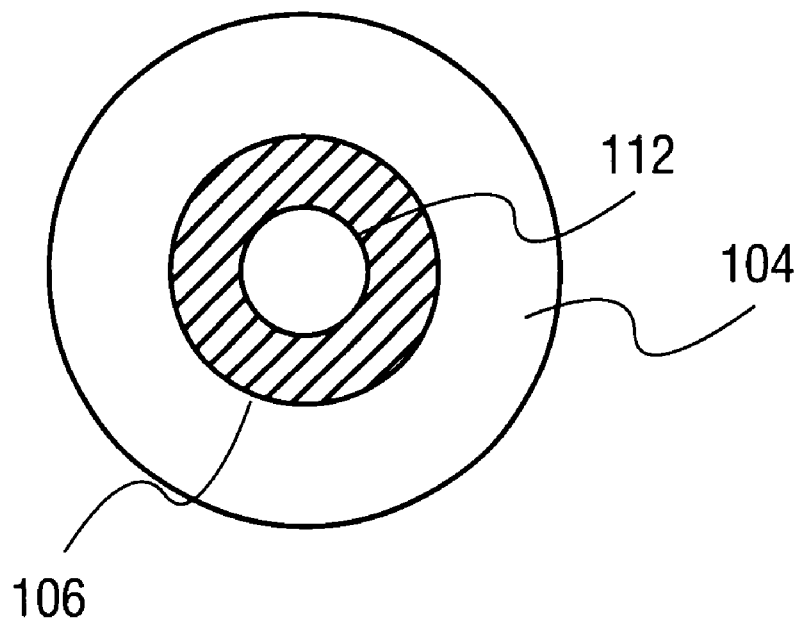
FIG. 3 is a view of an embodiment of the present invention.

FIG. 3 provides a view of calibration apparatus 100 in the positive z direction indicated in FIG. 2 when assembled. In the particular embodiment of FIG. 3, port 106 has a larger radius than the inner radius $r_2$ of optical baffle 112 so that a portion of optical baffle 112 is visible when viewed in the positive z direction.

Not shown in the figures are fastening mechanisms for attaching together integrating sphere portions 102 and 104, illuminator ring 108, and optical baffle 112. Any method for fastening may be employed. Preferably, the components of calibration apparatus 100 are attached together so that light substantially exits only port 106.

Figure 4:
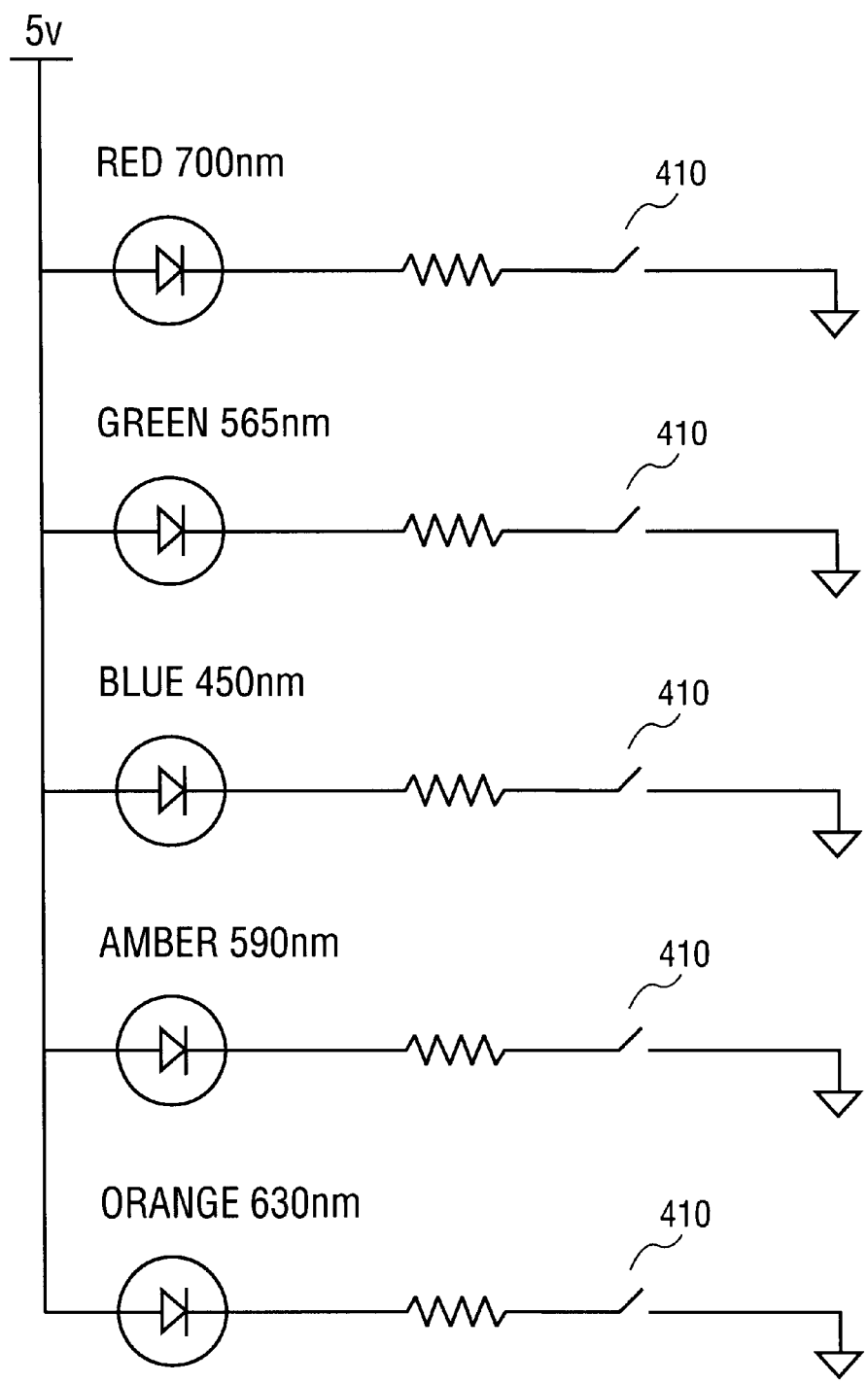
FIG. 4 is a circuit with light emitting diodes.

Not shown in the figures are electrical connections and a power supply for providing current to one or more light emitting diodes 110. A simplified circuit for switching one of five light emitting diodes is shown in FIG. 4, where five different colors and their corresponding wavelengths are indicated. Switches 410 may be simple switches, relays, transistors, or any other similar device for providing the function of a switch. More than one light emitting diode mounted on illuminator ring 110 may have the same color.

Many modifications may be made to the disclosed embodiments without departing from the scope of the invention as claimed below. For example, only a single ported integrating sphere has been illustrated in the figures, but additional ports may be introduced. Furthermore, the orientation of the illuminator ring and the optical baffle may be changed from that indicated in the figures. For example, the light emitting diodes may point toward the optical baffle rather than away as illustrated in FIG. 1. Furthermore, the light emitting diodes may be attached directly to the interior of the integrating sphere rather than using an illuminator ring. In addition, other light sources may be employed.

What is claimed is:

1. A calibration apparatus comprising:
    an intergrating, sphere having at least one port;
    an illuminator ring having an inner radius; and
    an optical baffle having an inner radius smaller than the inner radius of the illuminator ring.

2. The calibration apparatus as set forth in claim 1, further comprising:
    at least one light source mounted to the illuminator ring.

3. The calibration apparatus as set forth in claim 2, wherein the illuminator ring and the optical baffle are attached to the integrating sphere so that light provided by the at least one light source is reflected at least once upon the interior surface of the integrating sphere before exiting the at least one port.

4. The calibration apparatus as set forth in claim 3, wherein the at least one light source comprises at least one light emitting diode.

5. A method for calibrating an imaging device, the method comprising:
    providing an imaging device;
    providing an integrating sphere having at least one port and an optical baffle;
    illuminating the inside of the integrating sphere with at least one light source so that the imaging device is responsive to light exiting the at least one port; and
    calibrating the imaging device with the light exiting the at least one port.

6. The method as set forth in claim 5, wherein the optical baffle is positioned in the integrating sphere so that light provided by the at least one light source has reflected at least once upon the inner surface of the integrating sphere before exiting the at least one port.

7. The method as set forth in claim 5, wherein the at least one light source comprises at least one light emitting diode.

8. The method as set forth in claim 6, wherein the at least one light source comprises at least one light emitting diode.

* * * * *